(12) United States Patent
Hori et al.

(10) Patent No.: US 7,225,897 B2
(45) Date of Patent: Jun. 5, 2007

(54) STRUCTURE OF RECEIVING AND DELIVERING OIL

(75) Inventors: Yoshiaki Hori, Saitama (JP); Kinya Mizuno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 647 days.

(21) Appl. No.: 10/679,404

(22) Filed: Oct. 7, 2003

(65) Prior Publication Data

US 2004/0188181 A1 Sep. 30, 2004

(30) Foreign Application Priority Data

Oct. 9, 2002 (JP) ............................. 2002-296654

(51) Int. Cl.
*F01M 1/00* (2006.01)
(52) U.S. Cl. ...................................... 184/6.12; 277/377
(58) Field of Classification Search ............... 184/6.12; 277/581, 582, 377
See application file for complete search history.

(56) References Cited

U.S. PATENT DOCUMENTS 3,645,543 A * 2/1972 Ksieski ........................ 277/582
4,483,543 A * 11/1984 Fisher et al. ................. 277/584

FOREIGN PATENT DOCUMENTS

JP 04-165149 A 6/1992

* cited by examiner

*Primary Examiner*—David M. Fenstermacher
(74) *Attorney, Agent, or Firm*—Birch, Stewart, Kolasch & Birch, LLP

(57) ABSTRACT

A structure is provided for receiving and delivering oil from a first oil path in a wall of a casing to a second oil path within a rotating shaft supported by the casing on an inner side surface of the casing. A recess is formed in which the first oil path is opened. A collar is positioned on an inner peripheral surface of the recess. The collar is fitted in a floating state through an O-ring. On the inner peripheral surface of the collar an end portion of the rotating shaft is pivotally fitted to open the second oil path within the recess.

22 Claims, 3 Drawing Sheets

STRUCTURE OF RECEIVING AND DELIVERING OIL

CROSS-REFERENCE TO RELATED APPLICATIONS

The present application claims priority under 35 USC 119 to Japanese Patent Application No. 2002-296654 filed on Oct. 9, 2002 the entire contents thereof are hereby incorporated by reference.

BACKGROUND OF THE INVENTION

1. Field of the Invention

The present invention relates to an improvement in the structure of receiving and delivering oil from a first oil path in a wall of a casing to a second oil path within a rotating shaft which is rotatively supported by the casing.

2. Description of Background Art

A structure of receiving and delivering oil is disclosed, for example, in Japanese Patent Laid-Open No. 4-165149. In such a conventional structure for receiving and delivering oil, on the inner side surface of a casing, there is provided a recess in which a first oil path is opened. To a flange member to be fitted in the inner peripheral surface of this recess through a sealing member, there is mounted a feed pipe to be inserted into a second oil path of a rotating shaft. The tip end portion of this feed pipe is relative-rotatively fitted into a bushing which has been pressed into the inner peripheral surface of the second oil path. The oil is received and delivered from the first oil path to the second oil path through the feed pipe.

However, in such a structure there are a large number of parts and moreover, there are also a large number of assembly man-hours and machining man-hours such as the bushing being pressed into the inner peripheral surface of the second oil path and after the pressing-in, the inner peripheral surface of the bushing being machined with an excellent precision to become coaxial to the rotating shaft. The structure is disadvantageous in terms of cost.

SUMMARY AND OBJECTS OF THE INVENTION

The present invention has been achieved in view of the above-described state of affairs. It is aimed to provide a low-priced structure for receiving and delivering oil having a small number of parts, assembly man-hours and machining man-hours, capable of efficiently receiving and delivering the oil from the first oil path of the casing to the second oil path of the rotating shaft.

In order to achieve the above-described object, there is provided a structure for receiving and delivering oil from a first oil path in the wall of the casing to a second oil path within the rotating shaft to be supported by the casing. According to a first feature of the present invention, on the inner side surface of the casing, there is provided a recess in which the first oil path is opened. On the inner peripheral surface of this recess, there is fitted a collar in a floating state through an elastic sealing member. On the inner peripheral surface of this collar, the end portion of the rotating shaft is rotatably fitted to open the second oil path within the recess.

In this respect, the above-described rotating shaft and elastic sealing member correspond to the crankshaft 4 and the O-ring 36 in the embodiments of the present invention to be described later respectively.

According to the first feature of the present invention, by means of the elastic sealing member interposed between the inner peripheral surface of the recess and the collar, and the fine gap set between the collar and the rotating shaft, the oil which has reached the recess from the first oil path is restrained to a minimum from leaking outside of the collar. Therefore, in the recess, the oil can be efficiently received and delivered from the first oil path to the second oil path. The structure requires a small number of parts, assembly man-hours and machining man-hours, resulting in a low cost.

Moreover, since the collar is supported by the inner peripheral surface of the recess through the elastic sealing member in a floating state, even if eccentricity may occur in the rotating shaft, the eccentricity can be absorbed by elastic deformation of the elastic sealing member. Therefore, any excessive load is not applied to the collar, but the oil leak to the outside of the collar can be still be restricted to a minimum while the abrasion is being prevented.

Also, the second feature of the present invention provides the casing wherein the bearing for supporting the rotating shaft has been installed adjacent to the collar.

According to this second feature of the present invention, the eccentricity of the rotating shaft is restricted to a minimum by the bearing adjacent to the collar and the contact between the rotating shaft and the collar is reduced to make it possible to improve the durability of the collar.

Further, the third feature of the present invention provides an elastic sealing member that has been made into an O-ring and this has been fitted in the ring groove at the outer periphery of the collar.

According to the third feature of the present invention, by the integration of the collar and the O-ring, their assembling property to the recess can be made excellent.

Further, a fourth feature of the present invention provides the collar that has been made of a self lubricating material.

According to the fourth feature of the present invention, the collar has the self lubricating characteristics. Therefore, by minimizing the gap between the collar and the rotating shaft without taking lubrication of the collar into account, it becomes possible to more efficiently restrain the oil leak from between their fitted surfaces, and it is possible to further improve the receiving and delivering efficiency of the oil from the first oil path to the second oil path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

On the basis of preferred embodiments of the present invention shown in the accompanying drawings, the description will be made of embodiments of the present invention.

Figure 1:
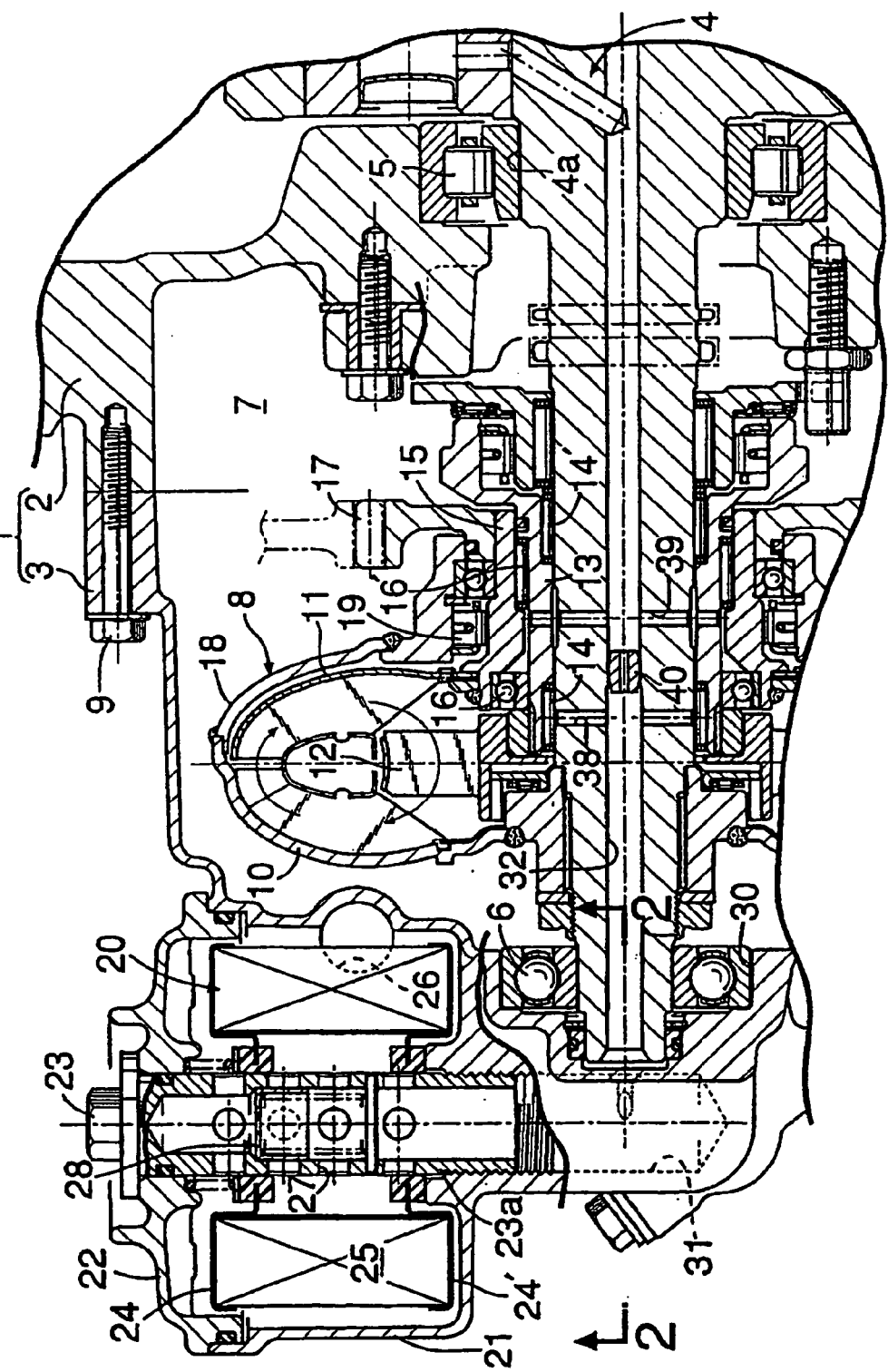
FIG. 1 is a longitudinal sectional view showing a transmission system for a vehicle having a structure for receiving and delivering oil according to the present invention.

As illustrated in FIG. 1, a casing 1 of a power unit is composed of a crankcase 2 of an engine with a transmission case 3 joined to the end surface of this crankcase 2 by a bolt 9. The crankcase 2 supports a journal 4a of a crankshaft 4 through a roller bearing 5. The transmission case 3 supports a tip end portion of the crankshaft 4 through a ball bearing 6.

In a transmission chamber 7 to be defined between the crankcase 2 and the transmission case 3, a torque converter 8 is mounted to the crankshaft 4. This torque converter 8 includes a pump impeller 10 in which a hub has been spline-connected to the crankshaft 4, a turbine runner 11 to be placed opposite to this pump impeller 10 and a stator 12 to be arranged between the pump impeller 10 and the turbine runner 11. A stator shaft 13 combined with the hub of the stator 12 is supported on an outer peripheral surface of the crankshaft 4 through a pair of left and right bearings 14, 14', on the outer periphery of the stator shaft 13. A turbine shaft 15 combined with the hub of the turbine runner 11 is supported through a pair of left and right bearings 16, 16'. An output gear 17 is fixed to the tip end portion of the turbine shaft 15.

At the outer peripheral end of the pump impeller 10, there is combined a side cover 18 for covering the back surface of the turbine runner 11. Between the hub of the side cover 18 and the turbine shaft 15, there is provided a one-way clutch 19. This one-way clutch 19 mechanically transmits a back load, which the turbine shaft 15 receives, to the pump impeller 10 for enabling engine brake.

On the end wall of the transmission case 3, there is integrally formed an oil filter housing 21 for accommodating an oil filter 20. At the inlet of this oil filter housing 21, a cap 22 is fixed by a bolt 23.

At the central portion of the bottom wall of the oil filter housing 21, a first oil path 31 is formed to which a hollow shaft portion 23a of the bolt 23 is threadably attached.

The oil filter 20 is composed of a pair of upper and lower end plates 24, 24' to be closely fitted to the outer periphery of the shaft portion 23a of the bolt 23 and a filter element 25 to be supported between these end plates 24, 24'. On the inner wall of the oil filter housing 21, a supply oil path 26 is opened which leads to a discharge port of an oil pump (not shown). Also, at the shaft portion 23a of the bolt 23, there is provided a through hole 27 through which the inner periphery side of the filter element 25 communicates to the hollow portion of the shaft portion 23a.

Also, at the hollow portion of the shaft portion 23a of the bolt 23, there is provided a relief valve 28 which when pressure within the oil filter housing 21 exceeds a fixed pressure because of clogging or the like of the filter element 25, causes the supply oil path 26 to bypass the filter element 25 for communicating to the hollow portion of the shaft portion 23a.

Figure 2:
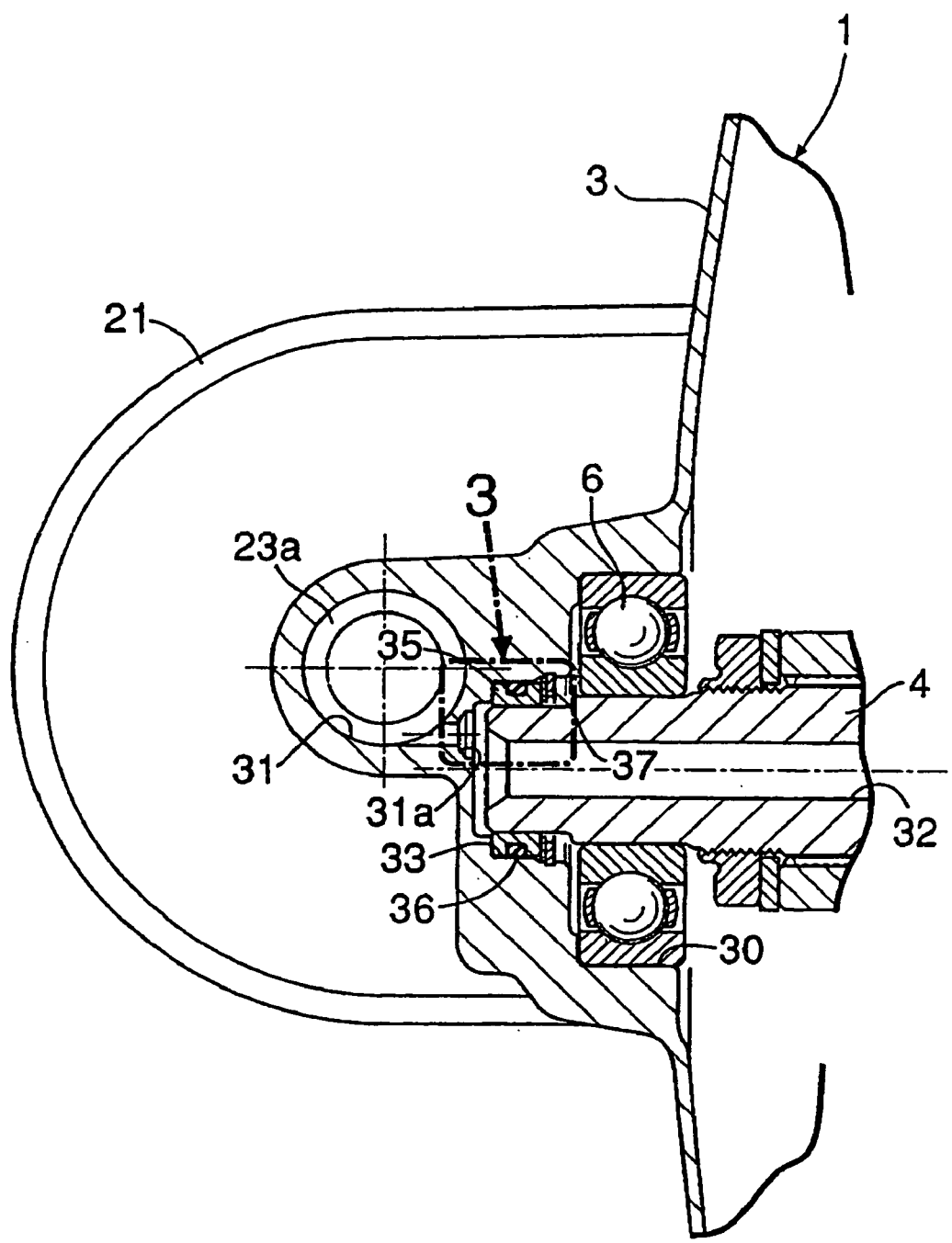
FIG. 2 is an enlarged sectional view taken on line 2—2 of FIG. 1.
Figure 3:
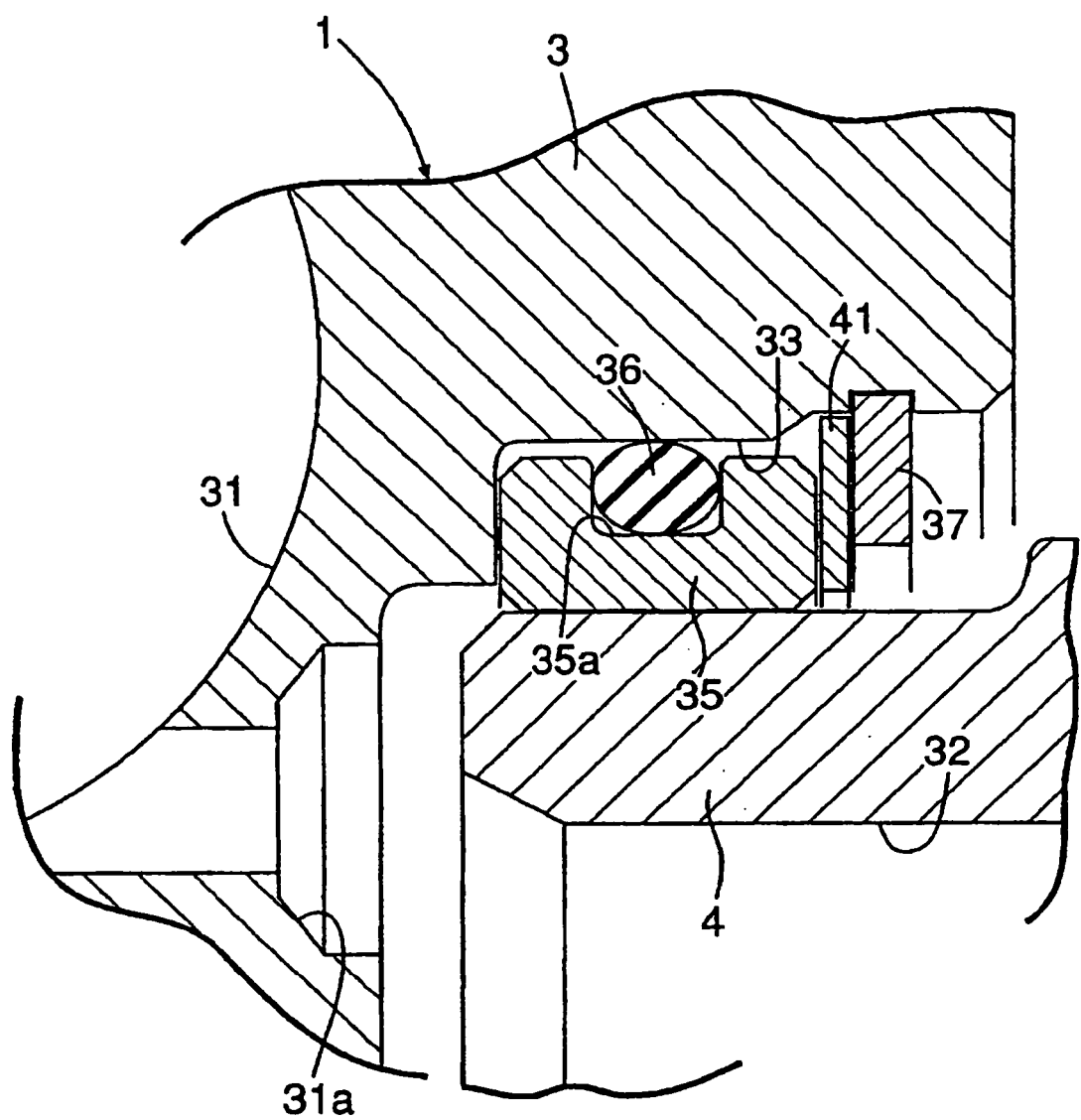
FIG. 3 is an enlarged sectional view showing portion 3 of FIG. 2.

As shown in FIGS. 2 and 3, at the inner wall of the transmission case 3, in the inner part of the bearing housing 30 to which the ball bearing 6 is installed, there is formed a recess 33 coaxial thereto, and in this recess 33, a downstream end 31a is opened which has been obtained by enlarging the first oil path 31.

In the inner peripheral surface of the above-described recess 33, a collar 35 made of copper is fitted through an O-ring 36. This collar 35 is prevented from coming off by means of an E-type clip 37 to be restrained at the opened end portion of the recess 33. Between this E-type clip 37 and the collar 35, there is interposed a thrust washer 41 for avoiding their direct contact.

The O-ring 36 is fitted into a ring groove 35a formed on the outer periphery of the collar 35 and is brought into press contact with the groove bottom of the ring groove 35a and the inner peripheral surface of the recess 33 with a fixed tightening margin. Between fitted surfaces of the collar 35 and the recess 35, there is set a gap of, for example, 0.1 to 0.2 mm, whereby the collar 35 is to be supported on the inner peripheral surface of the recess 33 in a floating state.

On the other hand, in the central portion of the crankshaft 4, there is formed a second oil path 32 for reaching a lubrication portion around the crankshaft 4 such as the outer peripheral surface of the crank pin from the end surface of the crankshaft 4. The tip end portion of this crankshaft 4 is fitted in the inner peripheral surface of the collar 35 relative-rotatively. In other words, between the fitted surfaces of the crankshaft 4 and the collar 35, there is set a fine gap for restraining oil to a minimum from leaking while allowing relative rotation of crankshaft 4 and collar 35. A gap of, for example, 0.02 to 0.048 mm is provided. Thus, an upstream end of the second oil path 32 opens in the recess 33.

Reverting to FIG. 1, the crankshaft 4 is also formed with an inlet port 38 for supplying working fluid within the torque converter 8 and an outlet port 39 for discharging the working fluid of the torque converter 8. A throttle tap 40 to be interposed between these inlet port 38 and outlet port 39 is pressed into the second oil path 32.

Next, the description will be made of an operation of the present embodiment.

During operation of the engine, oil which has been pressure-fed within the oil filter housing 21 through the supply oil path 26 by an oil pump (not shown) is filtered by an oil filter 20. Thereafter the oil is moved into the first oil path 31 through the through-hole 27 and the hollow portion of the shaft portion 23a to flow into the recess 33 from the downstream end 31a thereof. In this recess 33, the oil is received and delivered from the first oil path 31 to the second oil path 32 of the crankshaft 4.

At that time, by means of the O-ring 36 interposed between the inner peripheral surface of the recess 33 and the collar 35 and a fine gap set between the collar 35 and the crankshaft 4, the oil within the recess 33 is restrained from leaking outside of the collar 35 to a minimum. Therefore, in the recess 33, the oil can be efficiently received and delivered from the first oil path 31 to the second oil path 32. The structure requires a small number of parts, and therefore the assembly man-hour and the machining man-hour are small, resulting in a low price.

In this case, if the collar 35 is made of a self lubricating material such as oil-less metal and synthetic resin, it becomes unnecessary to take the lubrication of the collar 35 into account. Therefore, by minimizing the gap between fitted surfaces of the collar 35 and the crankshaft 4 to more efficiently restrain the oil leak from between the fitted surfaces, it is possible to further improve a receiving and delivering efficiency of the oil from the first oil path 31 to the second oil path 32.

Moreover, since the collar 35 is supported by the inner peripheral surface of the recess 33 through the O-ring 36 in a floating state, even if eccentricity may occur in the crankshaft 4 which is rotating, the eccentricity can be absorbed by elastic deformation of the O-ring 36. Therefore, an excessive load is not applied to the collar 35. The oil leak to the outside of the collar 35 can be still be restricted to a minimum while the abrasion is being prevented.

Also, since to the transmission case 3, the ball bearing 6 for supporting the tip end portion of the crankshaft 4 is installed adjacent to the recess 33, the eccentricity of the crankshaft 4 is restricted to a minimum and the contact between the crankshaft 4 and the collar 35 is reduced, whereby the durability of the collar 35 can be improved.

Further, since the O-ring 36 has been fitted into a ring groove 35*a* at the outer periphery of the collar 35 in advance and is made integral with the collar 35, it is possible to easily fit the collar 35 and O-ring 36 into the recess 33. Thus, the assembling property is excellent.

One portion of the oil which has moved to the second oil path 31 of the crankshaft 4 is supplied to a lubrication portion around the crankshaft 4 through the throttle tap 40 while other oil that is supplied within the torque converter 8 from the inlet port 38 is circulated within its interior. Thereafter the oil is returned to the second oil path 32 again through the outlet port 39, and merges with the oil which has passed through the throttle tap 40.

The present invention is not limited to the above-described embodiments, but the design can be changed in various ways without departing from the gist of the invention.

As described above, according to a first feature of the present invention, in a structure for receiving and delivering oil from a first oil path in the wall of the casing to a second oil path within the rotating shaft to be supported by the casing, on the inner side surface of the casing, there is provided a recess in which the first oil path is opened. On the inner peripheral surface of this recess, there is fitted a collar in a floating state through an elastic sealing member. On the inner peripheral surface of this collar, the end portion of the rotating shaft is rotatively fitted to open the second oil path within the recess. Therefore, by means of the elastic sealing member interposed between the inner peripheral surface of the recess and the collar, and the fine gap set between the collar and the rotating shaft, the oil which has reached the recess from the first oil path is restrained to a minimum from leaking in the outside of the collar. Therefore, in the recess, the oil can be efficiently received and delivered from the first oil path to the second oil path. The structure requires a small number each of parts, assembly man-hour and machining man-hour and results in a low price. Moreover, since the collar is supported by the inner peripheral surface of the recess through the elastic sealing member in a floating state, even if eccentricity may occur in the rotating shaft, the eccentricity can be absorbed by elastic deformation of the elastic sealing member. Therefore, any excessive load is not applied to the collar. The oil leak to the outside of the collar can still be restricted to a minimum while the abrasion is being prevented.

Also, according to a second feature of the present invention, to the casing the bearing for supporting the rotating shaft has been installed adjacent to the collar. The eccentricity of the rotating shaft is restricted to a minimum by the bearing adjacent to the collar and the contact between the rotating shaft and the collar is reduced to make it possible to improve durability of the collar.

Further, according to a third feature of the present invention, the elastic sealing member has been made into the O-ring and this has been fitted in the ring groove at the outer periphery of the collar, the assembling property of the collar and the O-ring to the recess can be made excellent due to their integration.

Further, according to a fourth feature of the present invention, the collar has been made of a self lubricating material. Thus, the collar has self lubricating characteristics. Therefore, by minimizing the gap between the collar and the rotating shaft without taking lubrication of the collar into account, it becomes possible to more efficiently restrain the oil leak from between their fitted surfaces. It is possible to further improve the receiving and delivering efficiency of the oil from the first oil path to the second oil path.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for receiving and delivering oil comprising:
 a casing;
 a first oil path formed in a wall of the casing;
 a rotating shaft;
 a second oil path within the rotating shaft, said rotating shaft being supported by said casing;
 a recess opened to said first oil path formed in an inner side surface of said casing;
 a collar fitted in an inner peripheral surface of the recess, said collar being fitted in a floating state through an elastic sealing member; and
 an end portion of said rotating shaft being rotatably fitted to open the second oil path within said recess.

2. The structure for receiving and delivering oil according to claim 1, and further including a bearing for supporting said rotating shaft, said bearing being installed adjacent to said collar.

3. The structure for receiving and delivering oil according to claim 1, wherein said elastic sealing member is an O-ring fitted in a ring groove at an outer periphery of said collar, an outer portion of the O-ring fitting against an inner cylindrical wall of the recess.

4. The structure for receiving and delivering oil according to claim 2, wherein said elastic sealing member is an O-ring fitted in a ring groove at an outer periphery of said collar, an outer portion of the O-ring fitting against an inner cylindrical wall of the recess.

5. The structure for receiving and delivering oil according to claim 1, wherein said collar is made of self lubricating material.

6. The structure for receiving and delivering oil according to claim 2, wherein said collar is made of self lubricating material.

7. The structure for receiving and delivering oil according to claim 3, wherein said collar is disposed on the end portion of said rotating shaft.

8. A structure for receiving and delivering oil comprising:
 a casing;
 a recess formed in a wall of the casing;
 a first oil path formed in said recess;
 a rotating shaft mounted within said recess;
 a second oil path formed within the rotating shaft;
 a collar fitted within said recess, said collar being fitted in a floating state through an elastic sealing member; and
 an end portion of said rotating shaft being rotatably fitted for selectively opening the second oil path to permit a flow of oil from the first oil path to said second oil path.

9. The structure for receiving and delivering oil according to claim 8, and further including a bearing for supporting said rotating shaft, said bearing being installed adjacent to said collar.

10. The structure for receiving and delivering oil according to claim 8, wherein said elastic sealing member is an O-ring fitted in a ring groove at an outer periphery of said collar.

11. The structure for receiving and delivering oil according to claim 9, wherein said elastic sealing member is an O-ring fitted in a ring groove at an outer periphery of said collar.

12. The structure for receiving and delivering oil according to claim 8, wherein said collar is made of self lubricating material.

13. The structure for receiving and delivering oil according to claim 9, wherein said collar is made of self lubricating material.

14. The structure for receiving and delivering oil according to claim 10, wherein said collar is disposed on the end portion of said rotating shaft.

15. A structure for receiving and delivering oil comprising:
   a recess formed in a wall of a casing;
   a rotating shaft mounted within said recess;
   a collar fitted within said recess, said collar being fitted in a floating state through an elastic sealing member;
   a first oil path formed by said recess and said collar;
   a second oil path formed within the rotating shaft;
   an end portion of said rotating shaft being rotatably fitted for selectively opening the second oil path to permit a flow of oil from the first oil path to said second oil path.

16. The structure for receiving and delivering oil according to claim 15, and further including a bearing for supporting said rotating shaft, said bearing being installed adjacent to said collar.

17. The structure for receiving and delivering oil according to claim 15, wherein said elastic sealing member is an O-ring fitted in a ring groove at an outer periphery of said collar, an outer portion of the O-ring fitting against an inner cylindrical wall of the recess.

18. The structure for receiving and delivering oil according to claim 16, wherein said elastic sealing member is an O-ring fined in a ring groove at an outer periphery of said collar, an outer portion of the O-ring fitting against an inner cylindrical wall of the recess.

19. The structure for receiving and delivering oil according to claim 15, wherein said collar is made of self lubricating material.

20. The structure for receiving and delivering oil according to claim 16, wherein said collar is disposed on the end portion of said rotating shaft.

21. The structure for receiving and delivering oil according to claim 1, wherein the recess opened to said first oil path formed in the inner side surface of a bearing housing in said casing.

22. The structure for receiving and delivering oil according to claim 8, wherein the collar is fitted within an inner cylindrical wall of said recess, and elastic sealing member is fitted into a ring groove formed on an outer periphery of the collar that faces the inner cylindrical wall of the recess.

* * * * *